(12) United States Patent
Goff

(10) Patent No.: US 7,788,416 B2
(45) Date of Patent: Aug. 31, 2010

(54) ENCAPSULATED HARDWARE CONFIGURATION/CONTROL

(75) Inventor: Lonnie Goff, Tempe, AZ (US)

(73) Assignee: NXP B.V., Eindhoven (NL)

( * ) Notice: Subject to any disclaimer, the term of this patent is extended or adjusted under 35 U.S.C. 154(b) by 784 days.

(21) Appl. No.: 10/538,458

(22) PCT Filed: Dec. 17, 2003

(86) PCT No.: PCT/IB03/06008

§ 371 (c)(1),
(2), (4) Date: Jun. 10, 2005

(87) PCT Pub. No.: WO2004/055668

PCT Pub. Date: Jul. 1, 2004

(65) Prior Publication Data

US 2006/0123145 A1    Jun. 8, 2006

Related U.S. Application Data

(60) Provisional application No. 60/434,738, filed on Dec. 18, 2002.

(51) Int. Cl.
*G06F 3/00* (2006.01)
(52) U.S. Cl. .............................. 710/8; 713/2
(58) Field of Classification Search .................. 710/10, 710/8
See application file for complete search history.

(56) References Cited

U.S. PATENT DOCUMENTS 5,887,165 A * 3/1999 Martel et al. ................. 713/100
5,887,193 A * 3/1999 Takahashi et al. ............... 710/8
5,938,764 A * 8/1999 Klein ............................. 713/1
6,363,437 B1 * 3/2002 Ptasinski et al. ............. 710/10
6,542,945 B1 * 4/2003 Koker et al. ................. 710/104
6,640,262 B1 * 10/2003 Uppunda et al. ............. 710/10
6,862,643 B2 * 3/2005 Wu et al. ..................... 710/302
7,064,579 B2 * 6/2006 Madurawe .................... 326/39
2003/0041205 A1 * 2/2003 Wu et al. ..................... 710/302

* cited by examiner

*Primary Examiner*—Henry W Tsai
*Assistant Examiner*—Elias Mamo

(57) ABSTRACT

A technique is provided for configuring and controlling complex hardware subsystems that relieves the burden placed on the system programmer and that is, by comparison to present methods, safe and error-free. In accordance with one aspect of the invention, configuration of a hardware subsystem (110) is accomplished by providing in hardware a configuration controller including a controller portion (113) and a storage portion (115) storing configuration parameters. The configuration controller (113) is activated, for example in response to a Configuration/Control ID, and thereupon performs configuration of the hardware subsystem (110), including storing at least one configuration parameter in a register (111) of the hardware subsystem. Typically, the configuration controller hardware (113) and storage (115) are embedded within the hardware subsystem to be configured or controlled. The configuration/control functionality is thus "encapsulated" within the hardware subsystem (110) itself such that the system programmer need not be concerned with details.

15 Claims, 1 Drawing Sheet

ENCAPSULATED HARDWARE CONFIGURATION/CONTROL

CROSS REFERENCE TO RELATED APPLICATION

Figure 1:
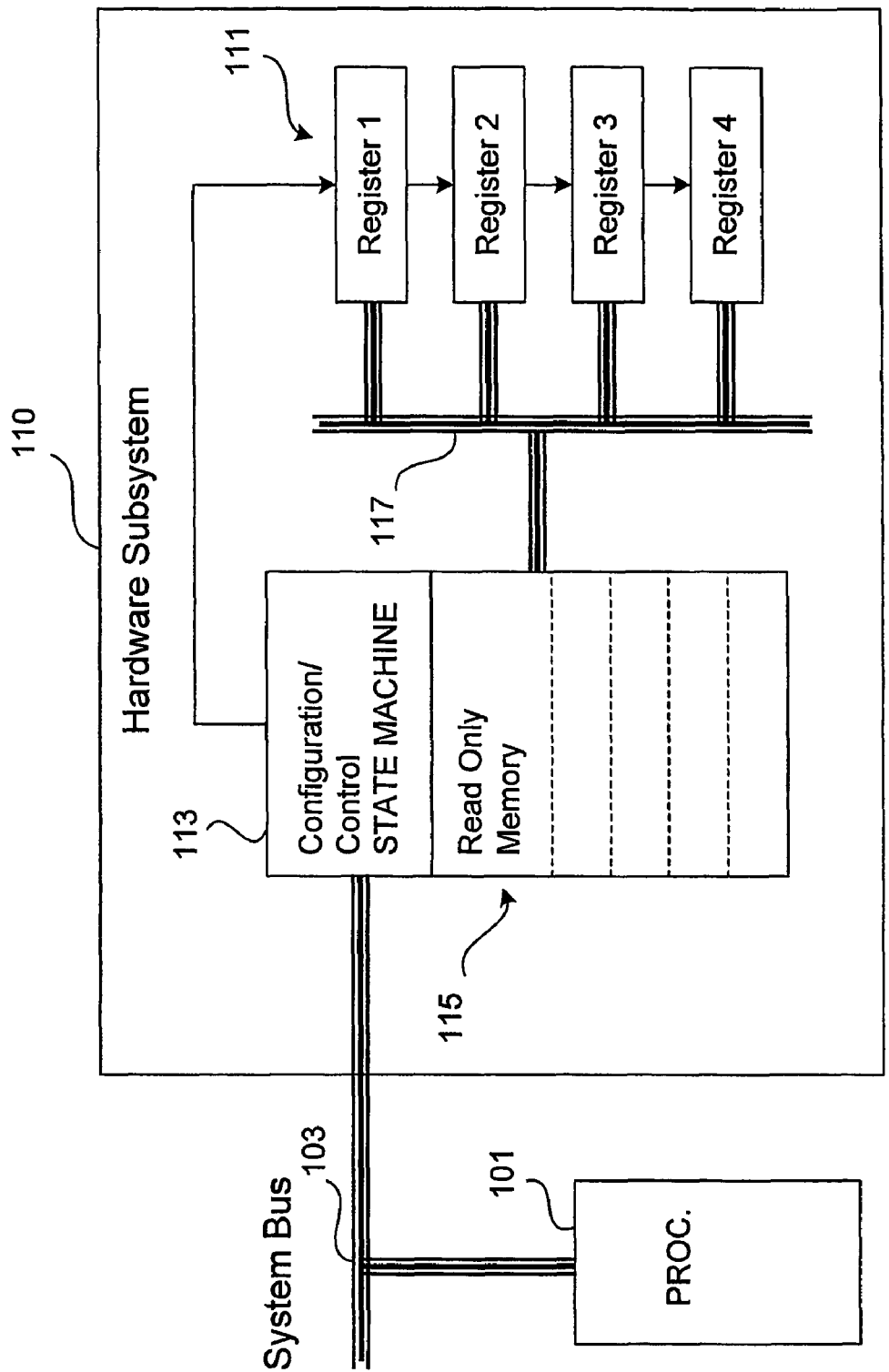

This application claims the benefit of U.S. provisional application Ser. No. 60/434,738 filed 18 Dec. 2002, which is incorporated herein by reference.

The present invention relates to configuration and control of hardware subsystems.

As integration density increases, hardware subsystems become increasingly complex. Such subsystems typically require initialization at start up and configuration or reconfiguration during subsequent operation. Control of the subsystem during operation may also entail configuration or reconfiguration. Such initialization, configuration, reconfiguration and control are presently accomplished through system programming, which may be embodied in hardware, firmware or software. Such system programming is laborious, error prone and, from a programming perspective, unsafe.

Presently the system programmer must first read a detailed specification of the hardware subsystem. This specification is often very large and may be unclear, contradictory, out-of-date or erroneous. Next, the programmer typically encodes a Hardware Abstraction Language that translates numerous registers and defined bits referred to in the specification into alphanumeric descriptions that permit programmers to configure and control the hardware subsystem with names instead of digits. There are typically no tools to aid in this task. Hence, construction of the Hardware Abstraction Language largely involves a laborious process of substitution that is unappealing to many programmers and hence error-prone.

As a result of this process, errors may occur in sequencing the commands and data passed through the Hardware Abstraction Interface. Errors may also occur because the specification was wrong or misunderstood. Moreover, because the hardware subsystem's interface is global in nature (i.e., any task typically has access to any subsystem's registers or memory), an errant or malicious task can wreak havoc. In this sense, the present scheme for configuration and control of complex hardware subsystems is unsafe.

What is needed is a technique for configuration and control of complex hardware subsystems that relieves the foregoing burden placed on the system programmer and that is by comparison safe and error-free.

The present invention, generally-speaking, provides a technique for configuring and controlling complex hardware subsystems that relieves the burden placed on the system programmer and that is, by comparison to present methods, safe and error-free. In accordance with one aspect of the invention, configuration of a hardware subsystem is accomplished by providing in hardware a configuration controller including a controller portion and a storage portion storing configuration parameters. The configuration controller is activated, for example in response to a Configuration/Control ID, and thereupon performs configuration of the hardware subsystem, including storing at least one configuration parameter in a register of the hardware subsystem. Typically, the configuration controller hardware and storage are embedded within the hardware subsystem to be configured or controlled. The configuration/control functionality is thus "encapsulated" within the hardware subsystem itself such that the system programmer need not be concerned with details of the functionality. The configuration controller may take the form of a state machine, for example.

A hardware subsystem may assume different configurations at different times during operation of the system. In this instance, multiple Configuration/Control IDs may be provided, each Configuration/Control ID corresponding to a particular configuration.

The invention will be better understood upon reference to the following detailed description and accompanying drawing. In the drawing:

FIG. 1 is a circuit diagram of a system using encapsulated hardware configuration/control.

Referring now to FIG. 1, there is shown a circuit diagram of a system using encapsulated hardware configuration/control. The system is an electronic system that may be of any of various forms, including for example, an electronic chassis, a circuit board, a multi-chip module or other module, a "System-On-a-Chip" (SOC) integrated circuit or other integrated circuit, etc. The system is assumed to include a processor 101 and a system bus 103. The system bus may connect to other busses (not shown) using one or more bus bridge interfaces as necessary.

Within the system, various subsystems are connected to the system bus, including a subsystem 110 to be configured or controlled. In the context of SOC, for example, one such typical subsystem might be a USB controller, for example. Other typical subsystems might include, for example, an SDRAM controller, a PLL/clock subsystem block, etc.

The subsystem 110 to be configured or controlled is illustrated in simplified form as including various hardware registers 111 and including in addition a Configuration/Control State Machine 113 and associated memory 115. The state machine 113 may be patterned after a complex instruction set processor. The memory 115 will typically be read-only. The Configuration/Control State Machine 113 is in communication with the system bus, and the memory 115 is in communication with various registers, e.g., via a subsystem bus 117. Preferably, the width of the memory 115 matches the width of the subsystem bus 117.

In operation, to configure or control the subsystem 110, a single simple Configuration/Control ID is passed from the processor 101 to the Configuration/Control State Machine 113, which may appear to system software simply as a register. The Configuration/Control State Machine 113 responds to the Configuration/Control ID by causing one or more write cycles to the subsystem's register set 111 to be performed. The system programmer may be oblivious to the inner workings of the Configuration/Control State Machine 113.

Multiple sets of configuration data may be stored within different portions of the memory 115, allowing for different configurations or different control operations. Different Configuration/Control IDs may be used to designate different sets of configuration data or different control operations.

One example of the use of multiple Configuration/Control IDs for a single subsystem is a USB (Universal Serial Bus) block in which particular ports (i.e., endpoints) can operate in Control, Interrupt, Isochronous or Bulk mode. In this instance, a different Configuration/Control ID is assigned to each mode. For each different mode, the Configuration/Control State Machine 113 responds to the corresponding Configuration/Control ID to write to potentially a large number of registers (e.g., endpoint enable register, endpoint interrupt register, DMA control register, etc.) without the significant potential for error encountered in the prior art approach. System software does not need to be aware of any of these "internal" registers; instead, system software simply needs to be aware of a relatively few Configuration/Control IDs. By writing a single Configuration/Control ID to a single "register" (the Configuration/Control State Machine 113), the desired configuration is reliably achieved.

A Configuration/Control ID may enable or disable various subsystem hardware options. In the case of a USB controller, for example, a control function might be to enable or disable automatic re-initialization of the DMA controller after a USB packet has been successfully received. (When this option is enabled, the DMA function is ready to accept the next packet without software intervention.) A Configuration/Control ID corresponding to Control mode would typically enable this option, whereas a Configuration/Control ID corresponding to Bulk mode typically would not.

Multiple different Control IDs may be used to access certain specific inner workings of a subsystem. For example, in a USB subsystem, one function that is controlled by the software is to put the subsystem into Suspend Mode in order to reduce power when there is no USB bus traffic. A single unique Control ID may be assigned to this function. Software would simply write this ID to the subsystem in order to enable this mode. The actual register and the particular bit in the register that performs this function would be hidden from view (i.e. encapsulated). An added benefit of this scheme is that a complete redesign to the USB block could be implemented without change to the software.

The invention having thus been described with respect to specific embodiments, it will be appreciated by those of ordinary skill in the art that the invention can be embodied in other specific forms without departing from the spirit or essential character thereof The presently disclosed embodiments are therefore considered in all respects to be illustrative and not restrictive. The scope of the invention is indicated by the appended claims, rather than the foregoing description, and all changes which come within the meaning and range of equivalence thereof are intended to be embraced therein.

What is claimed is:

1. A method of performing configuration or control of a hardware-based subsystem that includes multiple hardware registers that define multiple configurations of the hardware-based subsystem and that are connected to a processor via a system bus, the method comprising:
   providing together with the subsystem a configuration/control unit having a controller portion and a read-only storage portion storing multiple sets of configuration data, each of the sets of configuration data including configuration parameters for each of the multiple registers, and each of the sets of configuration data defining a respective one of the multiple configurations; and
   the configuration/control unit, in response to a single register write that identifies one of the sets of configuration data, encapsulating the multiple hardware registers by performing configuration, reconfiguration, initialization or control of the subsystem, and by including storing writing, the configuration parameters of the identified set of configuration data, from the read-only storage portion to each of the multiple registers of the hardware subsystem.

2. The method of claim 1, wherein the subsystem is a universal serial bus (USB) block, and the multiple configurations include Control mode, Interrupt mode, Isochronous mode, and Bulk mode, each of the modes encapsulated by a single write to a common register location, and wherein the configuration/control unit is a hardware configuration/control unit.

3. The method of claim 2, wherein the hardware subsystem and the hardware configuration/control unit are provided together within the same integrated circuit.

4. The method of claim 1, wherein the writing of the configuration parameters of the identified set in the multiple registers is implemented using a bus having a width sufficient to simultaneously store the configuration parameters of the identified set.

5. The method of claim 1, wherein the configuration/control unit is responsive to multiple different values for the single register write for performing different corresponding configuration or control actions with respect to the subsystem, each of the different values identifying one of the sets of configuration data.

6. A hardware-based subsystem having self-configuration capabilities and a processor connected to a system bus, comprising:
   a hardware register section that is connected to the system bus and including multiple hardware registers that define multiple configurations of the hardware subsystem; and
   a configuration/control unit having a controller portion and a read-only storage portion storing multiple sets of configuration data, each of the sets of configuration data including configuration parameters for each of the multiple registers, and each of the sets of configuration data defining a respective one of the multiple configurations;
   wherein the configuration/control unit is configured, responsive to a single register write that identifies one of the sets of configuration data, to encapsulate the multiple hardware registers by performing configuration, reconfiguration, initialization or control of the subsystem, including storing the configuration parameters of the identified set in the multiple hardware registers of the subsystem.

7. The subsystem of claim 6, wherein the subsystem is a universal serial bus (USB) block, and the multiple configurations include Control mode, Interrupt mode, Isochronous mode, and Bulk mode, each of the modes encapsulated by a single write to a common register location, and wherein the configuration/control unit is a hardware configuration/control unit.

8. The subsystem of claim 7 wherein the hardware subsystem and the hardware configuration/control unit are provided together within the same integrated circuit.

9. The subsystem of claim 6, further comprising a bus having a width sufficient to simultaneously store the configuration parameters of the identified set in the multiple registers.

10. The subsystem of claim 6, wherein the configuration/control unit is responsive to multiple different values for the single register write for performing different corresponding configuration or control actions with respect to the subsystem, each of the different values identifying one of the sets of configuration data.

11. For use in a system that includes a processor coupled to a hardware subsystem via a system bus, the hardware subsystem including a configuration/control unit and a plurality of hardware registers that define multiple configurations of the subsystem, a method of configuring the subsystem comprising:
   storing a plurality of sets of configuration data in a read-only memory of the configuration/control unit, each of the sets of configuration data including configuration parameters for each of the plurality of registers, and each of the sets of configuration data defining a respective one of the multiple configurations; and
   responsive to the configuration/control unit receiving, from the processor, a single register write that identifies one of the sets of configuration data, encapsulating the plurality of registers by writing the configuration parameters of the identified set from the read-only memory to the plurality of registers wherein the encapsulating includes configuration, reconfiguration, initialization or control of the hardware subsystem.

12. The method of claim 11, wherein the configuration/control unit is a state machine.

13. The method of claim 11, wherein the subsystem is a USB block comprising a plurality of ports that can operate in different modes responsive to which of the sets of configuration data is written to the plurality of registers.

14. The method of claim 11, wherein the storing of the configuration parameters of the identified set in the plurality of registers is implemented using a bus having a width sufficient to simultaneously store the configuration parameters of the identified set.

15. The method of claim 11, wherein the configuration/control unit is responsive to multiple different values for the single register write for performing different corresponding configuration or control actions with respect to the subsystem, each of the different values identifying one of the sets of configuration data.

* * * * *